United States Patent
Steinmetz et al.

(10) Patent No.: US 9,862,858 B2
(45) Date of Patent: Jan. 9, 2018

(54) METHOD FOR PRODUCING AND REPAIRING A MULTICOAT COLOR AND/OR EFFECT PAINT SYSTEM

(71) Applicant: BASF Coatings GmbH, Münster (DE)

(72) Inventors: Bernhard Steinmetz, Rütschenhausen (DE); Philipp Fieber, Leinach (DE)

(73) Assignee: BASF Coatings GmbH, Münster (DE)

( * ) Notice: Subject to any disclaimer, the term of this patent is extended or adjusted under 35 U.S.C. 154(b) by 173 days.

(21) Appl. No.: 14/429,413

(22) PCT Filed: Sep. 20, 2013

(86) PCT No.: PCT/EP2013/069606
§ 371 (c)(1),
(2) Date: Mar. 19, 2015

(87) PCT Pub. No.: WO2014/044811
PCT Pub. Date: Mar. 27, 2014

(65) Prior Publication Data
US 2015/0247059 A1  Sep. 3, 2015

Related U.S. Application Data

(60) Provisional application No. 61/703,800, filed on Sep. 21, 2012.

(30) Foreign Application Priority Data

Sep. 21, 2012  (EP) .................................. 12185471

(51) Int. Cl.
| | | |
|---|---|---|
| *C09D 175/16* | (2006.01) | |
| *C09D 4/06* | (2006.01) | |
| *C09D 175/06* | (2006.01) | |
| *C08G 18/42* | (2006.01) | |
| *C08L 75/04* | (2006.01) | |
| *C09D 175/00* | (2006.01) | |
| *B05D 5/06* | (2006.01) | |
| *B05D 7/00* | (2006.01) | |
| *C09D 17/00* | (2006.01) | |
| *C08K 5/53* | (2006.01) | |

(52) U.S. Cl.
CPC ............. *C09D 175/16* (2013.01); *B05D 5/06* (2013.01); *B05D 7/572* (2013.01); *C08G 18/4288* (2013.01); *C08L 75/04* (2013.01); *C09D 4/06* (2013.01); *C09D 17/003* (2013.01); *C09D 175/00* (2013.01); *C09D 175/06* (2013.01); *C08K 5/53* (2013.01); *Y10T 428/31551* (2015.04)

(58) Field of Classification Search
None
See application file for complete search history.

(56) References Cited

U.S. PATENT DOCUMENTS

| | | |
|---|---|---|
| 4,914,148 A | 4/1990 | Hille et al. |
| 5,334,420 A | 8/1994 | Hartung et al. |
| 5,368,944 A | 11/1994 | Hartung et al. |
| 5,658,617 A | 8/1997 | Gobel et al. |
| 5,773,508 A * | 6/1998 | Tendo ............. C09D 135/00 524/547 |
| 5,792,806 A | 8/1998 | Yamamoto et al. |
| 6,583,214 B1 | 6/2003 | Haeberle et al. |
| 6,632,915 B1 | 10/2003 | Schwarte et al. |
| 6,737,468 B1 | 5/2004 | Bremser |

(Continued)

FOREIGN PATENT DOCUMENTS

| | | |
|---|---|---|
| DE | 4009858 | 10/1991 |
| DE | 19914896 | 10/2000 |

(Continued)

OTHER PUBLICATIONS

Dziwinski et al. Composition of Cyanex® 923, Cyanex® 925, Cyanex® 921 and TOPO, Solvent Extraction and Ion Exchange, 16(6), 1515-1525 (1998).*

(Continued)

*Primary Examiner* — Francisco Tschen
(74) *Attorney, Agent, or Firm* — Servilla Whitney LLC

(57) ABSTRACT

Described is a method for producing a multicoat color and/or effect paint system. The method is characterized in that a pigmented aqueous basecoat material is used which comprises at least one phosphine oxide of formula (I):

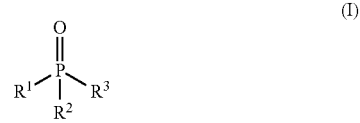

wherein the radicals $R^1$ to $R^3$ are selected from the group of aliphatic or aromatic hydrocarbons. The sum total of the weight percentage fractions of all of the phosphine oxides of formula (I) is 0.1% to 5% by weight, based on the total weight of the basecoat material. Also described are the corresponding basecoat materials, a corresponding multicoat color and/or effect paint system, and use of the phosphine oxides in pigmented aqueous coating materials. Further describes is a method for repairing defects on multicoat color and/or effect paint systems produced with the aid of the method of the invention.

10 Claims, No Drawings

(56) References Cited

U.S. PATENT DOCUMENTS

| | | | |
|---|---|---|---|
| 6,777,459 B2* | 8/2004 | Al-Akhdar | C08F 2/48 |
| | | | 522/107 |
| 8,211,504 B2 | 7/2012 | Wegner et al. | |
| 2003/0072943 A1* | 4/2003 | Anderson | B05D 7/57 |
| | | | 428/411.1 |
| 2008/0041273 A1* | 2/2008 | Baumgart | C08G 18/61 |
| | | | 106/287.13 |
| 2012/0301703 A1* | 11/2012 | Labock | C09D 5/185 |
| | | | 428/304.4 |

FOREIGN PATENT DOCUMENTS

| | | |
|---|---|---|
| DE | 19930665 | 1/2001 |
| DE | 19948004 | 7/2001 |
| DE | 10043405 | 6/2002 |
| EP | 0228003 | 7/1987 |
| EP | 0521928 | 1/1993 |
| EP | 0634431 | 1/1995 |
| WO | WO-91/15528 | 10/1991 |
| WO | WO-92/15405 | 9/1992 |

OTHER PUBLICATIONS

PCT International Preliminary Report on Patentability in PCT/EP2013/069606, dated May 7, 2015, 8 pages.
PCT International Search Report in PCT/EP2013/069606, dated Jan. 24, 2014, 2 pages.

* cited by examiner

METHOD FOR PRODUCING AND REPAIRING A MULTICOAT COLOR AND/OR EFFECT PAINT SYSTEM

CROSS-REFERENCE TO RELATED APPLICATIONS

This is application is the National Stage Entry of PCT/EP2013/069606, filed Sep. 20, 2013, which claims priority to U.S. Provisional Application Ser. No. 61/703,800, filed Sep. 21, 2012, and European Patent Application 12185471.5, filed Sep. 21, 2012, the disclosures of which are incorporate herein by reference in their entireties.

TECHNICAL FIELD

The invention relates to a method for producing a multicoat color and/or effect paint system, the method comprising
(1) applying a pigmented aqueous basecoat material to the substrate,
(2) forming a polymer film from the coating material applied in stage (1),
(3) applying a clearcoat material to the resulting basecoat film, and subsequently
(4) curing the basecoat film together with the clearcoat film.

The invention further relates to a multicoat color and/or effect paint system which is produced by the above-identified method, and also to a method for repairing defects on said multicoat color and/or effect paint system, by
(1) applying a pigmented aqueous basecoat material to the defect,
(2) forming a polymer film from the coating material applied in stage (1),
(3) applying a clearcoat material to the resulting basecoat film, and subsequently
(4) curing the basecoat film together with the clearcoat film.

The invention further relates to pigmented aqueous basecoat materials which are suitable for producing multicoat color and/or effect paint systems, and also to the use of phosphine oxides in pigmented aqueous basecoat materials.

BACKGROUND

The above-described method is known (e.g., German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) and is widely used, for example, not only for the OEM finishing but also for the refinishing of automobile bodies.

With the so-called basecoat/clearcoat method in question, using a wet-on-wet process, multicoat color and/or effect paint systems are obtained. In the course in particular of automotive OEM finishing, defects may occur in the resultant finish. Where defects are found in this finish—known as the original finish—the original finish is repaired. Where the original finish, for example, has defects extensively, the entire body or at least a corresponding portion is repaired, in other words painted a second time. Where only small defects require repair, it is only the so-called "spot" that is repaired, not the entire body. This operation is called "spot repair". It is of essential significance that the finish applied at the defects for repair purposes adheres outstandingly. The corresponding finish must for example be stable toward steam jet exposure. That is, steam jet exposure must not cause any loss of adhesion at all.

SUMMARY

A first aspect of the invention is directed to a method for producing a multicoat color and/or effect paint system. In a first embodiment, a method for producing a multicoat color and/or effect paint system comprises (1) applying a pigmented aqueous basecoat material to a substrate; (2) forming a polymer film from the coating material applied in stage (1); (3) applying a clearcoat material to the resultant basecoat film; and subsequently (4) curing the basecoat film together with the clearcoat film, wherein in stage (1) the pigmented aqueous basecoat material comprises at least one phosphine oxide of formula (I):

(I) wherein the radicals R1 to R3 are selected from the group of aliphatic or aromatic hydrocarbons and, wherein the sum total of the weight percentage fractions of all of the phosphine oxides of structural formula (I) is 0.1% to 5% by weight, based on the total weight of the aqueous basecoat material applied in stage (1).

In a second embodiment, the method of the first embodiment is modified, wherein the sum total of the weight percentage fractions of all of the phosphine oxides of formula (I) is 0.1% to 4.5% by weight, based on the total weight of the aqueous basecoat material applied in stage (1).

In a third embodiment, the method of the first and second embodiments is modified, wherein in stage (1) the pigmented aqueous basecoat material further comprises a binder comprising at least one saturated or unsaturated polyurethane resin.

In a fourth embodiment, the method of the first through third embodiments is modified, wherein in stage (1) the pigmented aqueous basecoat material further comprises at least one crosslinking agent selected from the group consisting of amino resins and blocked or nonblocked polyisocyanates.

In a fifth embodiment, the method of the first through fourth embodiments is modified, wherein the radicals R1 to R3 are selected from the group of aliphatic hydrocarbons.

In a sixth embodiment, the method of the first through fifth embodiment is modified, wherein a mixture of the phosphine oxides is used, the radicals R1 to R3 comprising a C3 to C16 alkyl radical and precisely two different types of radicals, R and R', are present, so that said mixture comprises the species R3P(O), R2R'P(O), RR'2P(O), and R'3P(O).

In a seventh embodiment, the method of the first through sixth embodiments is modified, wherein the radicals R1 to R3 are selected from the group of aromatic hydrocarbons.

A second aspect of the present invention is directed to a multicoat color and/or effect paint system. In an eighth embodiment, a multicoat color and/or effect paint system is produced by the method of the first through seventh embodiments.

A third aspect of the present invention is directed to a method for repairing defects. In a ninth embodiment, a method for repairing defects on the multicoat color and/or effect paint system of the eight embodiment comprises (1) applying a pigmented aqueous basecoat material to the defect; (2) forming a polymer film from the coating material applied in stage (1); (3) applying a clearcoat material to the resultant basecoat film; and subsequently (4) curing the basecoat film together with the clearcoat film, wherein in stage (1) the pigmented aqueous basecoat material comprises at least one phosphine oxide of formula (I):

(I) wherein the radicals R1 to R3 are selected from the group of aliphatic or aromatic hydrocarbons and, furthermore, the sum total of the weight percentage fractions of the phosphine oxides of formula (I) is 0.1% to 5% by weight, based on the total weight of the aqueous basecoat material applied in stage (1).

In a tenth embodiment, the method of the ninth embodiment is modified, wherein in stage (1) the pigmented aqueous basecoat material further comprises a binder comprising at least one saturated or unsaturated polyurethane resin.

In an eleventh embodiment, the method of the ninth and tenth embodiments is modified, wherein in stage (1) the pigmented aqueous basecoat material further comprises at least one crosslinking agent selected from the group consisting of amino resins and blocked or nonblocked polyisocyanates.

In a twelfth embodiment, the method of the ninth through eleventh embodiments is modified, wherein the radicals R1 to R3 are selected from the group of aliphatic hydrocarbons.

In a thirteenth embodiment, the method of the ninth through twelfth embodiments is modified, wherein the radicals R1 to R3 are selected from the group of aromatic hydrocarbons.

A fourth aspect of the present invention is directed to a pigmented aqueous basecoat material. In a fourteenth embodiment, a pigmented aqueous basecoat material comprises at least one phosphine oxide of formula (I):

(I) wherein the radicals R1 to R3 are selected from the group of aliphatic or aromatic hydrocarbons and, wherein the sum total of the weight percentage fractions of the phosphine oxides of formula (I) is 0.1% to 5% by weight, based on the total weight of the basecoat material.

DETAILED DESCRIPTION

Provided is a method of the type described above, by which multicoat color and/or effect paint systems are obtainable which, relative to the paint systems of the prior art, exhibit improved suitability of the coating material for refinishing. Provided also is a method by which defects on the above-identified multicoat color and/or effect paint systems can be repaired. An improved suitability of the coating material for refinishing means that the finish applied at the repaired locations adheres outstandingly there. In particular, the intention is for it to be stable toward steam jet exposure.

In one or more embodiments, in stage (1) of the above-described method for producing a multicoat color and/or effect paint system a pigmented aqueous basecoat material is used, which comprises at least one phosphine oxide of the following structural formula (I):

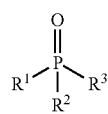

(I)

wherein the radicals $R^1$ to $R^3$ are selected from the group of the aliphatic or aromatic hydrocarbons and, furthermore, the sum total of the weight percentage fractions of all of the phosphine oxides of structural formula (I) is 0.1% to 5% by weight, based on the total weight of the aqueous basecoat material applied in stage (1).

The invention also relates to the above-described pigmented aqueous material which can be used in stage (1) of the basecoat/clearcoat method.

In stage (1) of the method, it is possible, in principle, to use all known aqueous basecoat materials, provided that they contain at least one of the above-defined phosphine oxides and that the sum total of the weight percentage fractions of all the phosphine oxides of structural formula (I) is 0.1% to 5% by weight, based on the total weight of the aqueous basecoat material applied in stage (1). Basecoat materials are identified as "aqueous" when they contain 30% to 70% by weight of water, based on the total weight of the basecoat material. The terms "aqueous basecoat material" and "waterborne basecoat material" are used as synonymous terms in this specification.

The basecoat materials of one or more embodiments comprise color and/or effect pigments. Color pigments and effect pigments of these kinds are known to the skilled person and are described for example in Römpp-Lexikon Lacke and Druckfarben, Georg Thieme Verlag, Stuttgart, N.Y., 1998, pages 176 and 451. The fraction of the pigments may be situated for example in the range from 1 to 40% by weight, specifically 2% to 20% by weight, more specifically 5% to 15% by weight, based on the total weight of the pigmented aqueous basecoat material.

In the method of the invention specificbasecoat materials may be used, which, as binders, comprise binders that are curable physically, thermally, or both thermally and with actinic radiation may be used.

As used herein, the term "(meth)acrylate" refers both to acrylate and to methacrylate. In other words, therefore, a corresponding polymer is constructed both of acrylates and of methacrylates. It may, however, equally well be constructed exclusively of acrylates or exclusively of methacrylates.

In one or more embodiments, at least one saturated or unsaturated polyurethane resin is present as binder. Coating materials of this kind comprising polyurethane resin may likewise typically be cured physically, thermally, or both thermally and with actinic radiation.

As used herein, the term "physical curing" denotes the formation of a film by loss of solvent from polymer solutions or polymer dispersions. Normally no crosslinking agents are necessary for such curing.

As used herein, the term "thermal curing" denotes the heat-initiated crosslinking of a coating film, for which either a separate crosslinking agent or else self-crosslinking binders is or are employed in the parent coating material. The crosslinking agent comprises reactive functional groups, which are complementary to the reactive functional groups present in the binders. This is normally referred to by those in the art as external crosslinking. Where the complementary reactive functional groups or autoreactive functional groups—that is, groups which react with groups of the same kind—are already present in the binder molecules, the binders are self-crosslinking. Examples of suitable complementary reactive functional groups and autoreactive functional groups are known from German patent application DE 199 30 665 A1, page 7, line 28 to page 9, line 24.

As used herein, actinic radiation means electromagnetic radiation such as near infrared (NIR), UV radiation, more particularly UV radiation, and particulate radiation such as electron beams. Curing by UV radiation is typically initiated by radical or cationic photoinitiators.

Where thermal curing and curing with actinic light are employed jointly, the term "dual cure" is also used.

In one or more embodiments, basecoat materials which are curable thermally or both thermally and with actinic radiation, in other words by dual cure, may be used. specificIn specific embodiments, basecoat materials which comprise a polyurethane resin as binder and an amino resin or a blocked or nonblocked polyisocyanate, specifically an amino resin, as crosslinking agent may be used. Among the amino resins, melamine resins are specific more particularly.

The polyurethane resin may have been hydrophilically stabilized ionically and/or nonionically. In specific embodiments, the polyurethane resin is hydrophilically stabilized ionically. The specific polyurethane resins are linear or contain branches. In one or more specific embodiments, the polyurethane resin is a resin which is connected with olefinically unsaturated monomers. Olefinically unsaturated monomers bonded to the polyurethane resin (A) are specifically monomers containing acrylate and/or methacrylate groups, thereby forming polyurethane (meth)acrylates. In one or more specific embodiment, the polyurethane resin is a polyurethane (meth)acrylate. The polyurethane resin is curable physically, thermally, or both thermally and with actinic radiation. More particularly, it is curable thermally or both thermally and with actinic radiation. In specific embodiments, the polyurethane resin comprises reactive functional groups which allow external crosslinking.

Suitable saturated or unsaturated polyurethane resins are described in, for example
German patent application DE 199 14 896 A1, column 1, lines 29 to 49 and column 4, line 23 to column 11, line 5;
German patent application DE 199 48 004 A1, page 4, line 19 to page 13, line 48;
European patent application EP 0 228 003 A1, page 3, line 24 to page 5, line 40;
European patent application EP 0 634 431 A1, page 3, line 38 to page 8, line 9; or
international patent application WO 92/15405, page 2, line 35 to page 10, line 32.

For preparing the polyurethane resin, aliphatic, cycloaliphatic, aliphatic-cycloaliphatic, aromatic, aliphatic-aromatic and/or cycloaliphatic-aromatic polyisocyanates that are known to the skilled person may be used.

As an alcohol component for preparing the polyurethane resins, saturated and unsaturated polyols of relatively high molecular mass and of low molecular mass, and also, optionally, monoalcohols as well, in minor amounts, these alcohols being known to the skilled person may be used. Low molecular mass polyols used are more particularly diols and, in minor amounts, triols, for the purpose of introducing branches. Examples of suitable polyols of relatively high molecular mass are saturated or olefinically unsaturated polyester polyols and/or polyether polyols. Used in particular as polyols of relatively high molecular mass are polyester polyols, more particularly those having a number-average molecular weight of 400 to 5000 g/mol (measured by gel permeation chromatography against a polystyrene standard).

For the purpose of hydrophilic stabilization and/or for raising the dispersibility in an aqueous medium, the polyurethane resin may comprise certain ionic groups and/or groups which can be converted into ionic groups (potentially ionic groups). Such polyurethane resins are referred to in the context of the present invention as ionically hydrophilically stabilized polyurethane resins. Likewise present may be nonionic hydrophilically modifying groups. Preferred, however, are the ionically hydrophilically stabilized polyurethanes. More specifically the modifying groups are alternatively
functional groups which can be converted by neutralizing agents and/or quaternizing agents in the cations, and/or cationic groups (cationic modification)
or
functional groups which can be converted by neutralizing agents into anions, and/or anionic groups (anionic modification)
and/or
nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted by neutralizing agents and/or quaternizing agents into cationic groups). Further deserving of mention are the cationic groups prepared from the aforementioned functional groups using neutralizing agents and/or quaternizing agents that are known to the skilled person, said cationic groups being such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic, sulfonic and/or phosphonic acid groups, especially carboxylic acid groups (functional groups which can be converted by neutralizing agents into anionic groups), and also anionic groups prepared from the aforementioned functional groups using neutralizing agents that are known to the skilled person, said anionic groups being such as carboxylate, sulfonate and/or phosphonate groups.

The functional groups for nonionic hydrophilic modification are specifically poly(oxyalkylene) groups, more particularly poly(oxyethylene) groups.

The ionically hydrophilic modifications may be introduced into the polyurethane resin by means of monomers which contain the (potentially) ionic groups. The nonionic modifications are introduced for example through the incorporation of poly(ethylene) oxide polymers as pendant or terminal groups of the polyurethane molecules. The hydrophilic modifications are introduced, for example, via compounds which comprise at least one group that is reactive toward isocyanate groups, specifically at least one hydroxyl group. For introducing the ionic modification, it is possible to use monomers which, as well as the modifying groups, contain at least one hydroxyl group. For introducing the nonionic modifications, polyetherdiols and/or alkoxypoly (oxyalkylene) alcohols that are known to the skilled person may be used.

The polyurethane resin may be a graft polymer. More particularly, the polyurethane resin is a polyurethane resin grafted by means of olefinically unsaturated compounds, specifically olefinically unsaturated monomers. In this case, therefore, the polyurethane is grafted, for example, with side groups and/or side chains which are based on olefinically unsaturated monomers. More particularly, these are side chains based on poly(meth)acrylates. Poly(meth)acrylates in the context of the present invention are polymers or polymeric radicals which comprise acrylate- and/or methacrylate-group-containing monomers, consisting specifically of acrylate- and/or methacrylate-group-containing monomers. Side chains based on poly(meth)acrylates are side chains which are constructed in the course of graft polymerization using monomers containing (meth)acrylate groups. In the graft polymerization in this case, more than 50 mol %, more particularly more than 75 mol %, and more particularly 100 mol %, of monomers containing (meth)acrylate groups, based on the total amount of the monomers used in the graft polymerization may be used.

The side chains described are introduced into the polymer specifically after the preparation of a primary polyurethane resin dispersion. In this case the polyurethane resin present in the primary dispersion may contain pendant and/or terminal olefinically unsaturated groups, via which the graft polymerization then proceeds with the olefinically unsaturated compounds. The polyurethane resin for grafting may thus be an unsaturated polyurethane resin (A). The graft polymerization is then a radical polymerization of olefinically unsaturated reactants. Also possible, for example, is for the olefinically unsaturated compounds used for the graft polymerization to comprise at least one hydroxyl group. In that case there may also first be an attachment of the olefinically unsaturated compounds via these hydroxyl groups, by reaction with free isocyanate groups of the polyurethane resin. This attachment takes place instead of or in addition to the radical reaction of the olefinically unsaturated compounds with the optionally present pendant and/or terminal olefinically unsaturated groups of the polyurethane resin. Afterward there is again the graft polymerization via radical polymerization as described earlier on above. What are obtained are, at any rate, polyurethane resins grafted with olefinically unsaturated compounds, specifically olefinically unsaturated monomers.

As olefinically unsaturated compounds with which the polyurethane resin (A) is grafted, it is possible to use virtually all radically polymerizable, olefinically unsaturated and organic monomers which are available to the skilled person for these purposes. The following may be mentioned as examples of certain specific classes of monomer:

hydroxyalkyl esters of (meth)acrylic acid or of other alpha,beta-ethylenically unsaturated carboxylic acids,
(meth)acrylic alkyl esters and/or cycloalkyl esters having up to 20 carbon atoms in the alkyl radical,
ethylenically unsaturated monomers comprising at least one acid group, more particularly precisely one carboxyl group, such as (meth)acrylic acid, for example,
vinyl esters of alpha-branched monocarboxylic acids having 5 to 18 carbon atoms,
reaction products of (meth)acrylic acid with the glycidyl ester of an alpha-branched monocarboxylic acid having 5 to 18 carbon atoms,
further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

In one or more embodiments, monomers containing (meth)acrylate groups may be used, and, hence, the grafted-on side chains are poly(meth)acrylate-based side chains.

The pendant and/or terminal olefinically unsaturated groups in the polyurethane resin, via which the graft polymerization with the olefinically unsaturated compounds is able to proceed, are introduced into the polyurethane resin specifically via particular monomers. These particular monomers, in addition to an olefinically unsaturated group, further comprise, for example, at least one group which is reactive toward isocyanate groups. Hydroxyl groups and also primary and secondary amino groups are preferred. Hydroxyl groups are especially preferred.

It is of course also possible to employ the monomers described via which the pendant and/or terminal olefinically unsaturated groups can be introduced into the polyurethane resin without the polyurethane resin being subsequently and additionally grafted with olefinically unsaturated compounds. In one or more specific embodiments, the polyurethane resin may be grafted with olefinically unsaturated compounds.

The polyurethane resin may be a self-crosslinking and/or externally crosslinking binder. In one or more embodiments, the polyurethane resin comprises reactive functional groups, through which external crosslinking is possible. In this case, the pigmented aqueous basecoat material specifically comprises at least one crosslinking agent. More particularly, the reactive functional groups which enable external crosslinking are hydroxyl groups. With particular advantage it is possible in the context of the method of the invention to use polyhydroxy-functional polyurethane resins. This means that the polyurethane resin contains on average more than one hydroxyl group per molecule.

The polyurethane resin is prepared by the customary techniques of polymer chemistry. By these are meant, for example, the polymerization of polyisocyanates and polyols to polyurethanes, and the graft polymerization that then follows with olefinically unsaturated compounds. These techniques are known to the skilled person and can be adapted individually. Illustrative preparation processes and reaction conditions are found in European patent specification EP 0521 928 B1, page 2, line 57 to page 8, line 16.

If the basecoat materials used are present in the form of self-crosslinking systems, the polyurethane resin content is 50% to 100% by weight, specifically 50% to 90% by weight and more specifically 50% to 80% by weight, based on the film-forming solids of the basecoat material.

By film-forming solids is meant the nonvolatile weight fraction of the basecoat material, without pigments and any fillers. The film-forming solids can be determined as follows: a sample of the pigmented aqueous basecoat material (approximately 1 g) is admixed with 50 to 100 times the amount of tetrahydrofuran and then stirred for around 10 minutes. The insoluble pigments and any fillers are then removed by filtration, the residue is rinsed with a little THF, and the THF is removed from the resulting filtrate on a rotary evaporator. The residue of the filtrate is dried at 120° C. for two hours, and the resulting film-forming solids is weighed.

In the case of externally crosslinking systems, the polyurethane resin content is between 10% and 80% by weight, specifically between 15% and 75% by weight and more specifically between 20% and 70% by weight, based in each case on the film-forming solids of the basecoat material.

In one or more embodiments, the polyurethane resin possesses a number-average molecular weight of 200 to 30 000 g/mol, specifically of 2000 to 20 000 g/mol (measured by gel permeation chromatography against a polystyrene standard, using tetrahydrofuran as eluent). It further possesses, for example, a hydroxyl number of 0 to 250 mg KOH/g, but more particularly of 20 to 150 mg KOH/g. The acid number of the polyurethane resin is specifically 5 to 200 mg KOH/g, more particularly 10 to 40 mg KOH/g. The hydroxyl number is determined in accordance with DIN/ISO 4629, the acid number in accordance with DIN 53402.

In one or more embodiments, the aqueous basecoat materials used in stage (1) of the method of the invention comprises at least one phosphine oxide which is characterized by the following structural formula (I):

(I)

wherein the radicals $R^1$ to $R^3$ are selected from the group of the aliphatic or aromatic hydrocarbons. Preference is given to aliphatic hydrocarbons having 1 to 20, more specifically 1 to 18 and very specifically 1 to 16 carbon atoms. In the case of the aliphatic hydrocarbons, the radicals in question are specifically alkyl radicals. More specifically, they are linear alkyl radicals. In the case of the aromatic hydrocarbons, the radical in question is specifically a phenyl radical.

It is preferred for all radicals $R^1$ to $R^3$ to be selected from the group of the aliphatic hydrocarbons. Preference is given to aliphatic hydrocarbons having 1 to 20, more specifically 1 to 18 and very specifically 1 to 16 carbon atoms. The radicals in question here are specifically alkyl radicals. More specifically they are linear alkyl radicals. Likewise with very particular preference, the radical in question in the case of $R^1$ to $R^3$ is an octyl or hexyl radical.

It is further preferred to use to phosphine oxides having precisely two different kinds of aliphatic hydrocarbon radicals. In such a case a mixture of phosphine oxides is used. This means that when two different kinds of aliphatic hydrocarbon radicals, identified here by R and R', are present, a corresponding mixture specifically comprises the species $R_3P(O)$, $R_2R'P(O)$, $RR'_2P(O)$ and $R'_3P(O)$, in other words all possible combinations which result with two different kinds of aliphatic hydrocarbon radicals. With particular preference R and R' are aliphatic hydrocarbons having 1 to 20, more specifically 1 to 18 and very specifically 1 to 16 carbon atoms. The radicals in question are specifically alkyl radicals. More specifically they are linear alkyl radicals. Likewise with very particular preference, the radicals in question in the case of R and R' are an octyl radical and a hexyl radical.

In one or more embodiments, a mixture of phosphine oxidesare characterized by the structure of Formula (I), wherein the radicals $R^1$ to $R^3$ are a $C_1$ to $C_{16}$ alkyl radical and precisely two different types of radicals, here denoted R and R', are present, so that the mixture comprises the species $R_3P(O)$, $R_2R'P(O)$, $RR'_2P(O)$, and $R'_3P(O)$.

It is likewise preferred for all radicals $R^1$ to $R^3$ to be selected from the group of the aromatic hydrocarbons. With particular preference the radicals in question here are phenyl radicals.

In one or more embodiments, the at least one phosphine oxide is selected from the group consisting of Cyanex® 923 (mixture of different hexyl- and octylphosphine oxides) and triphenylphosphine oxide (Cyanex® 923 is a brand name of the company Cytec).

The sum total of the weight percentage fractions of all of the phosphine oxides of structural formula (I) is 0.1% to 5% by weight, specifically 0.1% to 4.5% by weight and more specifically 0.15% to 4% by weight, based on the total weight of the aqueous basecoat material applied in stage (1). One of the abovementioned phosphine oxides or a mixture of the phosphine oxides to be used in accordance with the invention can be used here.

Where the sum total of the weight percentage fractions of all of the phosphine oxides of structural formula (I) is less than 0.1% by weight, based on the total weight of the aqueous basecoat material applied in stage (1), the object on which the invention is based is not achieved. Where the sum total of the weight percentage fractions of all of the phosphine oxides of structural formula (I) is more than 5% by weight, based on the total weight of the aqueous basecoat material applied in stage (1), disadvantages occur, such as, e.g., a deterioration in adhesion in the case of underbaked systems.

The sum total of the weight percentage fractions of all of the phosphine oxides of structural formula (I) is 0.1% to 5% by weight, based on the total weight of the aqueous basecoat material applied in stage (1). Where specific embodiments of said phosphine oxide are used, the sum total of the weight percentage fractions of all the specific embodiments of said phosphine oxide is specifically likewise 0.1% to 5% by weight, based on the total weight of the aqueous basecoat material applied in stage (1). With particular preference the aqueous basecoat material applied in stage (1) comprises, as phosphine oxide of structural formula (I), exclusively specific embodiments of said phosphine oxide.

In one specific embodiment, the sum total of the weight percentage fractions of all of the phosphine oxides of structural formula (I) is 0.1% to 4.5% by weight, based on the total weight of the aqueous basecoat material applied in stage (1). Where specific embodiments of said phosphine oxide are used, the sum total of the weight percentage fractions of all the specific embodiments of said phosphine oxide is specifically likewise 0.1% to 4.5% by weight, based on the total weight of the aqueous basecoat material applied in stage (1). With particular preference the aqueous basecoat material applied in stage (1) comprises, as phosphine oxide of structural formula (I), exclusively specific embodiments of said phosphine oxide.

In one particularly specific embodiment, the sum total of the weight percentage fractions of all of the phosphine oxides of structural formula (I) is 0.15% to 4% by weight, based on the total weight of the aqueous basecoat material applied in stage (1). Where specific embodiments of said phosphine oxide are used, the sum total of the weight percentage fractions of all the specific embodiments of said phosphine oxide is specifically likewise 0.15% to 4% by weight, based on the total weight of the aqueous basecoat material applied in stage (1). With particular preference the aqueous basecoat material applied in stage (1) comprises, as phosphine oxide of structural formula (I), exclusively specific embodiments of said phosphine oxide.

As an example of embodiments of said phosphine oxide that are preferred in this context, mention may be made of phosphine oxides of the structural formula (I) where all of the radicals $R^1$ to $R^3$ are selected from the group of the aliphatic hydrocarbons.

As another example of embodiments of said phosphine oxide that are specific in this context, mention may be made of a mixture of phosphine oxides to be used in accordance with the invention, the radicals $R^1$ to $R^3$ being a $C_1$ to $C_{16}$ alkyl radical and precisely two different types of radicals, here denoted R and R', being present, so that said mixture comprises the species $R_3P(O)$, $R_2R'P(O)$, $RR'_2P(O)$ and $R'_3P(O)$.

As a further example of embodiments of said phosphine oxide that are specific in this context, mention may be made of phosphine oxides of the structural formula (I), all of the radicals $R^1$ to $R^3$ being selected from the group of the aromatic hydrocarbons.

In one or more embodiments, there is also a thickener present. Suitable thickeners are inorganic thickeners from the group of the phyllosilicates. Besides the inorganic thickeners, however, it is also possible to use one or more organic thickeners. These are specifically selected from the group consisting of (meth)acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. (Meth)acrylic acid-(meth)acrylate copolymer thickeners are those which in addition to acrylic acid and/or methacrylic acid also comprise in copolymerized form one or more acrylic esters (i.e. acrylates) and/or one or more methacrylic esters (i.e. methacrylates). A feature common to the (meth)acrylic acid-(meth)acrylate copolymer thickeners is that in alkaline medium, in other words at pH levels >7, more particularly >7.5, they exhibit a sharp rise in viscosity, owing to salt formation by the acrylic acid and/or methacrylic acid, in other words the formation of carboxylate groups. Where (meth)acrylic esters are used that are formed from (meth)acrylic acid and a $C_1$-$C_6$ alkanol, the resulting (meth)acrylic acid-(meth)acrylate copolymer thickeners are substantially nonassociative in their effect, such as the aforementioned Viscalex HV30, for example. Substantially nonassociative (meth)acrylic acid-(meth)acrylate copolymer thickeners are also referred to in the literature as ASE thickeners (alkali-soluble/swellable emulsion or dispersion). As (meth)acrylic acid-(meth)acrylate copolymer thickeners it is also possible, however, to use those referred to as HASE thickeners (hydrophobically modified anionic soluble emulsions or dispersions). These are obtained if the alkanol used, instead of or in addition to the $C_1$-$C_6$ alkanols, comprises alkanols having a greater number of carbon atoms, for example 7 to 30, or 8 to 20 carbon atoms. HASE thickeners have a substantially associative thickening effect. On the basis of their thickening properties, the (meth)acrylic acid-(meth)acrylate copolymer thickeners that can be used are not suitable as binder resins, and hence are not included among the physically, thermally or both thermally and actinically curable binders that are identified as binders, and they are therefore explicitly different from the poly(meth)acrylate-based binders which can be used in the basecoat compositions of the invention. Polyurethane thickeners are the associative thickeners referred to in the literature as HEUR (hydrophobically modified ethylene oxide urethane rheology modifiers). In chemical terms these are nonionic branched or nonbranched block copolymers of polyethylene oxide chains (sometimes also polypropylene oxide chains) which are linked to one another via urethane bonds and which carry terminal long-chain alkyl or alkylene groups having 8 to 30 carbon atoms. Examples of typical alkyl groups are dodecyl or stearyl groups; an example of a typical alkenyl group is an oleyl group; a typical aryl group is the phenyl group; and an example of a typical alkylated aryl group is a nonylphenyl group. On account of their thickening properties and structure, the polyurethane thickeners are not suitable as physically, thermally or both thermally and physically curable binder resins. They are therefore explicitly different from the polyurethanes which can be used as binders in the basecoat compositions of the invention.

In one or more embodiments, the pigmented aqueous basecoat material further comprises at least one polyester, more particularly a polyester having a number-average molecular weight of 400 to 5000 g/mol (measured by gel permeation chromatography against a polystyrene standard, using tetrahydrofuran as eluate). Corresponding polyesters are described in DE 4009858 in column 6, line 53 to column 7, line 61 and column 10, line 24 to column 13, line 3.

The pigmented aqueous basecoat material may further comprise at least one adjuvant. Examples of such adjuvants are salts which can be decomposed thermally without residue or substantially without residue, physically, thermally and/or actinic-radiation-curable resin binders that are different from polyurethane resins, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical polymerization initiators, adhesion promoters, flow control agents, film-forming assistants, sag control agents (SCAs), flame retardants, corrosion inhibitors, waxes, siccatives, biocides, and matting agents.

Suitable adjuvants of the aforementioned kind are known for example from

German patent application DE 199 48 004 A1, page 14, line 4, to page 17, line 5, and German patent DE 100 43 405 C1, column 5, paragraphs [0031] to [0033].

They are used in the customary and known amounts.

The solids content of the basecoat materials used in accordance with the invention may vary according to the requirements of the case in hand. The solids content is guided primarily by the viscosity that is necessary for application, especially for spray application, and so may be adjusted by the skilled person on the basis of his or her common general knowledge, with the assistance where appropriate of a few rangefinding tests.

In one or more embodiments, the solids content of the basecoat materials is specifically 5% to 70% by weight, more specifically 10% to 65% by weight, and with more particular preference 15% to 60% by weight.

The solids content is that weight fraction which remains as a residue on evaporation under defined conditions. In the present specification, the solids was determined in accordance with DIN EN ISO 3251. The measurement time was 60 minutes at 125° C.

The basecoat materials used in accordance with the invention can be prepared using the mixing assemblies and mixing methods that are customary and known for producing basecoat materials.

The basecoat materials of the invention can be employed as one-component (1K), two-component (2K) or multicomponent (3K, 4K) systems. 1K systems are preferred.

In one-component (1K) systems, binder and crosslinking agent are present in one component. A prerequisite for this is that the two constituents undergo crosslinking with one another only at relatively high temperatures and/or on exposure to actinic radiation.

In two-component (2K) systems, for example, binder and crosslinking agent are present separately from one another in two components, which are not combined until shortly before application. This form is selected when binder and crosslinking agent undergo reaction with one another even at room temperature. Coating materials of this kind are employed especially for coating thermally sensitive substrates, more particularly in automotive refinish.

The pigmented aqueous basecoat material used in accordance with the invention may be applied to a substrate in the film thicknesses that are customary in the context of the automobile industry in the range, for example, of 5 to 100 micrometers, specifically 5 to 60 micrometers. This is done by employing, for example, spray application methods, such as, for example, compressed air spraying, airless spraying, high speed rotation, or electrostatic spray application (ESTA), optionally combined with hot spray application such as hot air spraying, for example.

After the pigmented aqueous basecoat material has been applied, it can be dried by known techniques. For example, 1K basecoat materials can be flashed off at room temperature for 1 to 60 minutes and subsequently dried at optionally slightly elevated temperatures of 30 to 80° C. Flashing off and drying in the context of the present invention means the evaporation of organic solvents and/or water whereby the coating material becomes dryer but is not yet cured. Or as yet no fully crosslinked coating film is formed.

A commercially customary clearcoat material is then applied likewise by commonplace techniques, the film thicknesses again lying in the commonplace ranges, such as 5 to 100 micrometers, for example. Clearcoat materials of this kind are known to the skilled person.

After the clearcoat has been applied it can be flashed off at room temperature for 1 to 60 minutes, for example, and optionally dried. The clearcoat material is then cured together with the applied pigmented basecoat material. Here, for example, crosslinking reactions take place, producing a multicoat color and/or effect paint system of the invention on a substrate. In one or more embodiments, curing takes place thermally, or both thermally and with actinic radiation, at temperatures from 80 to 200° C.

The method of the invention can be used to coat metallic and nonmetallic substrates, more particularly plastics substrates, specifically automobile bodies or parts thereof.

The invention further provides a multicoat color and/or effect paint system which is producible by the method of the invention. Therefore, the observations above with regard to the aqueous basecoat material which is used for example in stage (1) of the method of the invention for producing a multicoat color and/or effect paint system, and also concerning the phosphine oxide that is present therein, apply equally to the multicoat color and/or effect paint system in question. This is true more particularly also for all of the stated preferred, more preferred and very preferred features.

The present invention further relates to the above-described method for repairing defects on the multicoat color and/or effect paint systems of the invention, where in stage (1) a pigmented aqueous basecoat material is used which comprises at least one phosphine oxide of the following structural formula (I):

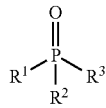

(I)

wherein the radicals $R^1$ to $R^3$ are selected from the group of the aliphatic or aromatic hydrocarbons and, moreover, the sum total of the weight percentage fractions of all of the phosphine oxides of structural formula (I) is 0.1% to 5% by weight, based on the total weight of the aqueous basecoat material applied in stage (1).

In one or more embodiments, the aqueous basecoat material used in stage (1) of the method of the invention for repairing defects maybe the same as that which is used in the method of the invention for producing a multicoat color and/or effect paint system. The above observations concerning the aqueous basecoat material therefore also apply to the method in question for repairing defects on a multicoat color and/or effect paint system. This is especially true also for all stated preferred, more preferred and very preferred features.

As is known, the multicoat color and/or effect paint systems produced using the method of the invention may exhibit defects. Defects, or film defects, are generally disruptions to and in the coating, and are usually named according to their shape or their appearance. The skilled person knows of a multiplicity of possible kinds of such film defects. They are described for example in Rompp-Lexikon Lacke and Druckfarben, Georg Thieme Verlag, Stuttgart, N.Y., 1998, page 235, "Film defects".

Said defects may be repaired by the above-described method of the invention.

Before the pigmented aqueous basecoat material is applied, the defect can be abraded.

In one or more embodiments, application of the pigmented aqueous basecoat material to the defect in the original finish is accomplished by pneumatic atomization. Following the application of the pigmented aqueous basecoat material, it can be dried by known techniques. For example, the basecoat material can be dried at room temperature for 1 to 60 minutes and subsequently dried at optionally slightly elevated temperatures of 30 to 80° C. Flashing off and drying in the context of the present invention means the evaporation of organic solvents and/or water, as a result of which the paint becomes dryer, but is not yet cured, or as yet no fully crosslinked coating film is formed.

A commercially customary clearcoat material is then applied, by techniques that are likewise commonplace, to the site of the intended repair. As is generally customary in refinishing, and therefore known to the skilled person, it is preferred to use clearcoat materials which can be cured even at relatively low temperatures of 30 to 80° C. Two-component clearcoat materials in particular are suitable for this purpose.

After the clearcoat has been applied, it can be flashed off at room temperature for 1 to 60 minutes, for example, and optionally dried. The clearcoat material is then cured together with the applied pigmented basecoat material. Curing is accomplished thermally or both thermally and with actinic radiation at temperatures from 30 to 80° C.

The invention further provides a pigmented aqueous basecoat material which is characterized in that the basecoat material comprises at least one phosphine oxide of the following structural formula (I):

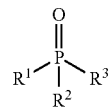

(I)

wherein the radicals $R^1$ to $R^3$ are selected from the group of the aliphatic or aromatic hydrocarbons and, furthermore, the sum total of the weight percentage fractions of all of the phosphine oxides of structural formula (I) is 0.1% to 5% by weight, based on the total weight of the basecoat material. This pigmented aqueous basecoat material is suitable more particularly for producing multicoat color and/or effect paint systems. The above observations concerning the aqueous basecoat material which is used for example in stage (1) of the method of the invention for producing a multicoat color and/or effect paint system, and also concerning the phosphine oxide present therein, therefore apply equally to the pigmented aqueous basecoat material in question. This is so in particular also for all above preferred, more preferred and very preferred features.

Finally, the invention likewise provides the use of at least one phosphine oxide in pigmented aqueous basecoat materials for improving adhesion, and is characterized in that the said basecoat material comprises at least one phosphine oxide of the following structural formula (I):

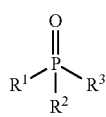
(I)

wherein the radicals $R^1$ to $R^3$ are selected from the group of the aliphatic or aromatic hydrocarbons and, furthermore, the sum total of the weight percentage fractions of all of the phosphine oxides of structural formula (I) is 0.1% to 5% by weight, based on the total weight of the basecoat material.

An improvement in adhesion means an improvement of the adhesion in comparison to those pigmented aqueous basecoat materials which do not comprise phosphine oxide for use in accordance with the invention. The adhesion can be determined with the aid for example of the steam jet exposure in accordance with DIN 55662:2009-12 (method A).

All of the above observations concerning the aqueous basecoat material which is used for example in stage (1) of the method of the invention for producing a multicoat color and/or effect paint system, and also concerning the phosphine oxide present therein, therefore apply equally to the inventive use of at least one phosphine oxide in pigmented aqueous basecoat materials. This is so in particular also for all above preferred, more preferred and very preferred features.

The said phosphine oxide is used specifically in refinish for improving adhesion. By this is meant more particularly that the finish applied at the repaired locations adheres outstandingly there.

The invention is elucidated below by means of examples.

EXAMPLES

1. Preparation of a Silver Waterborne Basecoat Material 1

The components listed under "aqueous phase" in table A are combined with stirring in the order stated to form an aqueous mixture. In the next step, an organic mixture is prepared from the components listed under "organic phase". The organic mixture is added to the aqueous mixture. The combined mixture is then stirred for 10 minutes and is adjusted using deionized water and dimethanolamine to a pH of 8 and to a spray viscosity of 58 mPas under a shearing load of 1000/sec as measured using a rotary viscometer (Rheomat RM 180 instrument from Mettler-Toledo) at 23° C.

TABLE A

| Component | Parts by weight |
|---|---|
| Aqueous phase | |
| 3% strength Na Mg phyllosilicate solution | 26 |
| Deionized water | 3 |
| Butyl glycol | 1.75 |
| Polyurethane acrylate; prepared as per page 7 line 55-page 8 line 23 of DE-A-4437535 | 4.5 |
| 50% strength by weight solution of DSX 1550 (BASF), rheological agent | 0.6 |
| Polyester; prepared as per example D, column 16, lines 37-59 of DE-A-4009858 | 3.2 |
| Tensid S (BASF), surfactant | 0.3 |
| Butyl glycol | 0.55 |
| Cymel 203; melamine-formaldehyde resin, available from Cytec | 4.1 |
| 10% strength dimethylethanolamine in water | 0.3 |

TABLE A-continued

| Component | Parts by weight |
|---|---|
| Deionized water | 6 |
| Polyurethane acrylate; prepared as per page 19, line 44-page 20, line 7 of DE-A-19948004 | 20.4 |
| Tensid S (BASF), surfactant | 1.6 |
| Butyl glycol | 0.5 |
| 3% by weight aqueous Viscalex HV 30 solution; rheological agent, available from BASF, in water | 3.9 |
| Organic phase | |
| Mixture of two commercial aluminum pigments, available from Altana-Eckart | 6.2 |
| Butyl glycol | 7.5 |
| Polyester; prepared as per example D, column 16, lines 37-59 of DE-A-4009858 | 5 |

Waterborne Basecoat Material I1:

To prepare the inventive waterborne basecoat material I1 waterborne basecoat material 1 was admixed with 2.5 part by weight of commercially available Cyanex® 923.

Waterborne Basecoat Material I2:

To prepare the inventive waterborne basecoat material I2, waterborne basecoat material 1 was admixed with 2.5 parts by weight of commercially available triphenyl phosphine oxide.

TABLE 1

Compositions of waterborne basecoat materials and I1 and I2

| WBM | [% by weight] | Phosphine oxide |
|---|---|---|
| 1 | — | — |
| I1 | 2.5 | Cyanex ® 923 |
| I2 | 2.5 | Triphenylphosphine oxide |

The weight percentages in table 1 relate to the fraction of the phosphine oxide in the respective waterborne basecoat material.

Comparative Test Between Waterborne Basecoat Material 1 And Waterborne Basecoat Materials I1 and I2

For determining the stability against steam jet exposure, the multicoat paint systems were produced in accordance with the following general instructions:

A steel panel coated with a standard cathodic electrocoat (Cathoguard® 800 from BASF Coatings GmbH) and with dimensions of 10×20 cm was coated with a standard primer-surfacer (ALG 670173 mid-gray primer-surfacer from Hemmelrath). Following interim drying of the aqueous primer-surfacer over a period of 10 at 80° C., it was baked at a temperature of 190° C. over a period of 30 minutes.

The waterborne basecoat material was then applied pneumatically. The resulting waterborne basecoat material film was flashed off at room temperature for 2 minutes and subsequently dried in a forced-air oven at 70° C. for 10 minutes. Applied over the dried waterborne basecoat film was a customary two-component clearcoat material (Progloss® 345 from BASF Coatings GmbH). The resulting clearcoat film was flashed off at room temperature for 20 minutes. The waterborne basecoat film and the clearcoat film were subsequently cured in a forced-air oven at 160° C. for 30 minutes. The present system represents an overbaked original system and is referred to hereinafter as original finish.

This original finish is abraded with an abrasive paper and then the waterborne basecoat material is applied pneumatically to this abraded original finish. The resulting waterborne basecoat film was flashed off at room temperature for 2 minutes and then dried in a forced-air oven at 70° C. for 10 minutes. Applied to the dried waterborne basecoat film was an 80° C. two-component clearcoat material (FF230500 2K refinish clearcoat, scratch-resistant, from BASF Coatings GmbH). The resulting clearcoat film was flashed off at room temperature for 20 minutes. Subsequently the waterborne basecoat film and the clearcoat film were cured in a forced-air oven at 80° C. for 30 minutes.

The steel panels thus treated were then subjected to steam jet testing in accordance with DIN 55662:2009-12 (method A) and subsequently assessed in accordance with the above-mentioned DIN.

TABLE 2

Steam jet results for waterborne basecoat material 1 and waterborne basecoat materials I1 and I2

| WBM | Steam jet assessment | Assessment |
|---|---|---|
| 1 | 5a | unsat. |
| I1 | 0 | sat. |
| I2 | 0 | sat. |

Key:
sat. = satisfactory result
unsat. = unsatisfactory result

The results corroborate that when using the phosphine oxides of the invention the stability toward steam jet exposure is improved.

What is claimed is:

1. A method for producing a multicoat color and/or effect paint system, the method comprising
   (1) applying a pigmented aqueous basecoat material to a substrate;
   (2) forming a polymer film from the coating material applied in stage (1);
   (3) applying a clearcoat material to the resultant basecoat film; and subsequently
   (4) curing the basecoat film together with the clearcoat film,
   characterized in that wherein in stage (1) the pigmented aqueous basecoat material comprises at least one phosphine oxide of formula (I):

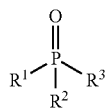

(I)

wherein the radicals $R^1$ to $R^3$ are selected from the group of aliphatic hydrocarbons and, wherein the sum total of the weight percentage fractions of all of the phosphine oxides of structural formula (I) is 0.1% to 5% by weight, based on the total weight of the aqueous basecoat material applied in stage (1).

2. The method of claim 1, wherein the sum total of the weight percentage fractions of all of the phosphine oxides of formula (I) is 0.1% to 4.5% by weight, based on the total weight of the aqueous basecoat material applied in stage (1).

3. The method of claim 1, wherein in stage (1) the pigmented aqueous basecoat material further comprises a binder comprising at least one saturated or unsaturated polyurethane resin.

4. The method of claim 1, wherein in stage (1) the pigmented aqueous basecoat material further comprises at least one crosslinking agent selected from the group consisting of amino resins and blocked or nonblocked polyisocyanates.

5. The method of claim 1, wherein a mixture of the phosphine oxides is used, the radicals $R^1$ to $R^3$ comprising a $C_3$ to $C_{16}$ alkyl radical and precisely two different types of radicals, R and R', are present, so that said mixture comprises the species $R_3P(O)$, $R_2R'P(O)$, $RR'_2P(O)$, and $R'_3P(O)$.

6. A multicoat color and/or effect paint system produced by the method of claim 1.

7. A method for repairing defects on the multicoat color and/or effect paint system of claim 6, the method comprising
   (1) applying a pigmented aqueous basecoat material to the defect;
   (2) forming a polymer film from the coating material applied in stage (1);
   (3) applying a clearcoat material to the resultant basecoat film; and subsequently
   (4) curing the basecoat film together with the clearcoat film,
   characterized in that wherein in stage (1) the pigmented aqueous basecoat material comprises at least one phosphine oxide of formula (I):

wherein the radicals $R^1$ to $R^3$ are selected from the group of aliphatic hydrocarbons and, furthermore, the sum total of the weight percentage fractions of the phosphine oxides of formula (I) is 0.1% to 5% by weight, based on the total weight of the aqueous basecoat material applied in stage (1).

8. The method of claim 7, wherein in stage (1) the pigmented aqueous basecoat material further comprises a binder comprising at least one saturated or unsaturated polyurethane resin.

9. The method of claim 7, wherein in stage (1) the pigmented aqueous basecoat material further comprises at least one crosslinking agent selected from the group consisting of amino resins and blocked or nonblocked polyisocyanates.

10. A pigmented aqueous basecoat material comprising at least one phosphine oxide of formula (I):

wherein the radicals $R^1$ to $R^3$ are selected from the group of aliphatic hydrocarbons and, wherein the sum total of the weight percentage fractions of the phosphine oxides of formula (I) is 0.1% to 5% by weight, based on the total weight of the basecoat material.

* * * * *